United States Patent
Li et al.

(10) Patent No.: US 9,513,977 B2
(45) Date of Patent: *Dec. 6, 2016

(54) ISA BRIDGING WITH CALLBACK

(75) Inventors: Jianhui Li, Shanghai (CN); Ling Lin, Shanghai (CN); Yong Wu, Shanghai (CN); Xiaodong Lin, Shanghai (CN); Wen Tan, Shanghai (CN); Honesty Cheng Young, Chicago, IL (US); Yihua Jin, Shanghai (CN)

(73) Assignee: Intel Corporation, Santa Clara, CA (US)

(*) Notice: Subject to any disclaimer, the term of this patent is extended or adjusted under 35 U.S.C. 154(b) by 15 days.

This patent is subject to a terminal disclaimer.

(21) Appl. No.: 13/995,935

(22) PCT Filed: Jan. 10, 2012

(86) PCT No.: PCT/CN2012/070163
§ 371 (c)(1),
(2), (4) Date: Oct. 8, 2013

(87) PCT Pub. No.: WO2013/104107
PCT Pub. Date: Jul. 18, 2013

(65) Prior Publication Data
US 2014/0040921 A1    Feb. 6, 2014

(51) Int. Cl.
*G06F 3/00* (2006.01)
*G06F 9/54* (2006.01)
*G06F 9/455* (2006.01)

(52) U.S. Cl.
CPC ............. *G06F 9/54* (2013.01); *G06F 9/45504* (2013.01); *G06F 9/541* (2013.01)

(58) Field of Classification Search
CPC ....................................................... G06F 9/54
USPC ......................................................... 719/328
See application file for complete search history.

(56) References Cited

U.S. PATENT DOCUMENTS 7,080,363 B2   7/2006  Yellin et al.
7,380,235 B1*  5/2008  Fathalla ........................ 717/109
(Continued)

FOREIGN PATENT DOCUMENTS

CN    1682181 A    10/2005
CN    102110011 A  6/2011
(Continued)

OTHER PUBLICATIONS

Robert A. Ballance, Monitoring MPI Programs for Performance Characterization and Management Control, Mar. 22, 2010.*
(Continued)

*Primary Examiner* — Lechi Truong
(74) *Attorney, Agent, or Firm* — Schwabe, Williamson & Wyatt, P.C.

(57) ABSTRACT

Methods, apparatuses and storage medium associated with ISA bridging with callback, are disclosed. In various embodiments, at least one computer-readable storage medium may include instructions configured to enable a target device with a target ISA, in response to execution of the instructions, to provide an ISA bridging layer to the target device to facilitate a library service to callback a callback function of an application. The library service may be implemented for the target ISA, and the application may be implemented at least partially for a source ISA that may be different from the target ISA. The ISA bridging layer may include a source ISA emulator and a library emulator configured to cooperate to enable the application to call the library service, and the library service to callback the callback function, across the two instruction set architectures. Other embodiments may be disclosed or claimed.

17 Claims, 5 Drawing Sheets

(56) References Cited

U.S. PATENT DOCUMENTS

| | | | |
|---|---|---|---|
| 7,415,701 B2* | 8/2008 | Wang et al. | 717/127 |
| 7,516,453 B1 | 4/2009 | Bugnion | |
| 7,870,387 B1* | 1/2011 | Bhargava et al. | 713/166 |
| 7,941,641 B1 | 5/2011 | Jung | |
| 7,958,232 B1* | 6/2011 | Colton et al. | 709/224 |
| 2004/0123299 A1* | 6/2004 | O'Neill | 718/107 |
| 2005/0216701 A1 | 9/2005 | Taylor | |
| 2006/0150202 A1* | 7/2006 | Bendapudi et al. | 719/328 |
| 2006/0184919 A1* | 8/2006 | Chen | G06F 9/45516 717/127 |
| 2007/0079301 A1* | 4/2007 | Chinya et al. | 717/151 |
| 2007/0079304 A1 | 4/2007 | Zheng et al. | |
| 2007/0294665 A1* | 12/2007 | Papakipos et al. | 717/119 |
| 2008/0172657 A1 | 7/2008 | Bensal et al. | |
| 2009/0150869 A1 | 6/2009 | Fong et al. | |
| 2010/0223603 A1 | 9/2010 | Linden | |
| 2011/0289586 A1* | 11/2011 | Kc et al. | 726/24 |
| 2012/0089976 A1 | 4/2012 | Ma et al. | |

FOREIGN PATENT DOCUMENTS

| | | | |
|---|---|---|---|
| EP | 2482184 A1 | 1/2012 | |
| JP | 2008516324 A | 5/2008 | |
| JP | 2008546085 A | 12/2008 | |

OTHER PUBLICATIONS

International Search Report and Written Opinion, mailed Nov. 1, 2012 for PCT Application No. PCT/CN2012/0797989, 10 pages.
Office Action mailed Nov. 3, 2013 for U.S. Appl. No. 13/745,203, 26 pages.
Search Report mailed Sep. 30, 2014 for Taiwan Patent Application No. 102100701, 7 pages.
Office Action mailed Aug. 4, 2015 for Japanese Patent Application No. 2014-550609, 3 pages.
Extended European Search Report mailed Aug. 5, 2015 for European Patent Application No. 12865442.3, 7 pages.
Chih-Sheng Wang et al., "A method-based ahead-of-time compiler for android applications", Compilers, Architectures and Synthesis for Embedded Systems (CASES), 2011 Proceedings of the 14th International Conference on, IEEE, 2 Penn Plaza, Suite 701, Oct. 9, 2011, New York, NY, pp. 15-24.
International Preliminary Report on Patentability mailed Jul. 24, 2014 for International Application No. PCT/CN2012/070163, 6 pages.
International Search Report and Written Opinion mailed Oct. 25, 2012 for International Application No. PCT/CN2012/070163, 10 pages.
Office Action mailed Apr. 12, 2016 for Japanese Patent Application No. 2014-550609, 9 pages.

* cited by examiner

ISA BRIDGING WITH CALLBACK

CROSS REFERENCE TO RELATED APPLICATIONS

The present application is a national phase entry under 35 U.S.C. §371 of International Application No. PCT/CN2012/070163, filed Jan. 10, 2012, entitled "ISA BRIDGING WITH CALLBACK", which designated, among the various States, the United States of America. The Specification of the PCT/CN2012/070163 Application is hereby incorporated by reference.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computing device may be characterized by its Instruction Set Architecture (ISA). Typically, a computing device may include Operating System (OS) services, and the OS services may include the runtime library services (LIB), developed for the ISA of the computing device, to facilitate application developers to develop applications to operate on the computing device. For example, various smartphones may be characterized by the use of the ARM processor and its ISA. These smartphones may include an OS, e.g., iOS or Android, in support of the various applications developed for the respective smartphones. Some computing devices offer an ISA-independent execution environment, such as Java™ or Android Application Framework. However, a large number of applications nonetheless include ISA dependent portions that invoke services of ISA-dependent runtime libraries. Further, these ISA dependent portions often include callback functions requiring callbacks from the ISA-dependent runtime libraries, and such callbacks are often not discovered until runtime, rendering traditional approaches, such as binary translation, inadequate in addressing the needs.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Methods, apparatuses and storage medium associated with ISA bridging with callback are disclosed. In various embodiments, at least one computer-readable storage medium may include instructions configured to enable a target device with a target ISA, in response to execution of the instructions, to provide an ISA bridging layer to the target device to facilitate a library service to callback a callback function of an application. The library service may be implemented for the target ISA, and the application may be implemented at least partially for a source ISA that may be different from the target ISA. The ISA bridging layer may include a source ISA emulator and a library emulator configured to cooperate to enable the application to call the library service, and the library service to callback the callback function, across the two instruction set architectures.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
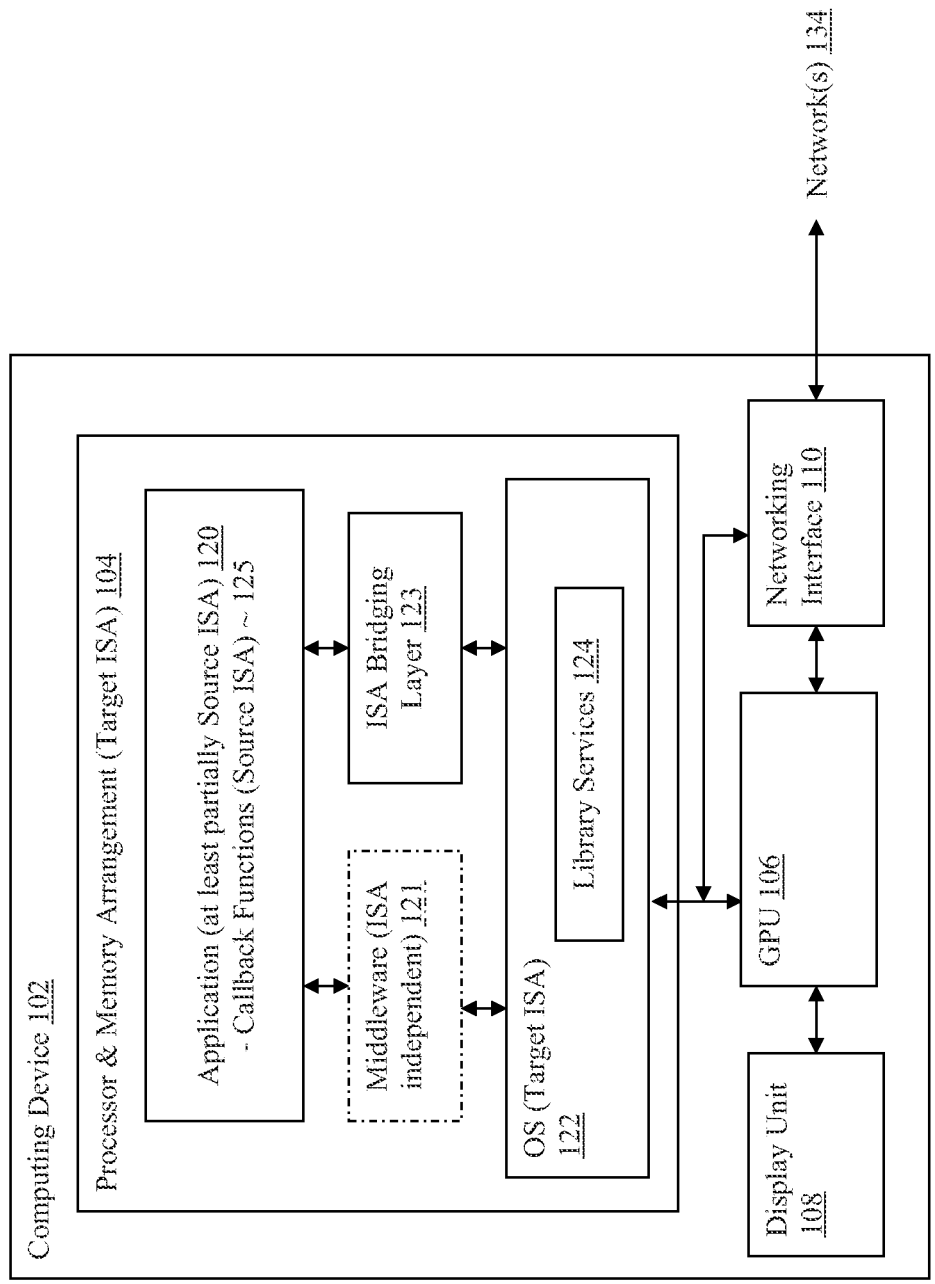
FIG. 1 illustrates an example computing device incorporated with ISA bridging with callback.

FIG. 1 illustrates an example computing device incorporated with ISA bridging with callback, in accordance with various embodiments of the present disclosure. As shown, for the illustrated embodiments, computing device 102 may include processor and memory arrangement 104 configured to have operating system (OS) 122, ISA bridging layer 123, and application 120 operated therein, graphics processing unit (GPU) 106, display unit 108, and networking interface 110, coupled with each other as shown. OS 122 may include a library of services 124. Additionally, computing device 102 may also include optional middleware 121 between application 120 and OS 122. As will be described in more detail below, ISA bridging layer 123 may be configured with various runtime features and services (including, but are not limited to, e.g., dynamic binding) to enable application 120 to be implemented in a source ISA in whole or in part (e.g., when an ISA-independent middleware 121 is also used), while OS 122 (including library services 124) may be implemented in a target ISA that is different from the source ISA. Further, application 120 may be an application (in particular, the portion implemented using source ISA) that includes usage characteristics of library services 124 that require various ones of library services 124 to callback various callback functions 125 of application 120, under various conditions. ISA bridging layer 123 may also be referred to as a process virtual machine (PVM).

Computing device 102 may be a server, a desktop computer, a laptop computer, a tablet computer, a smartphone, a personal digital assistant, a game console, an Internet appliance, or other computing devices of the like. Examples of computing device 102 may include, but are not limited to, the servers available from Hewlett Packard of Palo Alto, Calif., desktop or laptop computers available from Dell Computer of Austin, Tex., smartphones and computing tablets available from Apple Computer of Cupertino, Calif., game console available from Nintendo Corporation of Tokyo, Japan, and so forth.

Processor and memory arrangement 104 is intended to represent a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth. In various embodiments, GPU 106 may be configured to provide video decoding and/or graphics processing functions to OS 122, while display unit 108 may be configured to enable multimedia content, e.g., HD video, to be rendered thereon. Similarly, GPU 106 and display unit 108 are intended to represent a broad range of graphics processors and display elements known in the art. Likewise, network(s) 134 is (are) intended to represent a broad range of networks known in the art. Examples of network(s) 134 may include wired or wireless, local or wide area, private or public networks, including the Internet.

OS 122 (including library services 124), except for the application programming interface (API) defining invocation of library service 124, is intended to represent a broad range of operating system elements known in the art. OS 122 may include conventional components such as a kernel configured to manage memory resources, schedule task execution, and so forth, and device drivers configured to manage various device resources. In embodiments, OS 122 may include a virtual machine in support of middleware 121 (if employed), e.g., Android's virtual machine in support of the Android application framework. For the embodiments, in addition to defining invocations of library services 124, to facilitate invocation of callback functions 125 of application 120, the API of library services 124 may also include the corresponding stubs and signatures of callback functions 125 of application 120. Examples of OS 122 may include, but are not limited to Windows® operating systems, available from Microsoft Corporation of Redmond, Wash., Linux, available from e.g., Red Hat® of Raleigh, N.C., Android™ developed by the Open Handset Alliance, or iOS, available from Apple® Computer of Cupertino, Calif.

Similarly, middleware 121 is intended to represent a broad range of middleware elements known in the art including, but not limited to, ISA-independent middleware. Examples of middleware 121 may include, but are not limited to, Android Application Framework, Java™, or other application frameworks or ISA-independent execution environments.

Likewise, application 120 (including callback functions 125) is intended to represent a broad range of applications known in the art. Examples of application 120 may include, but are not limited to, personal assistant, productivity, or social networking applications, such as, calendar, word processing, spreadsheet, Twitter, Facebook, et al, or generic application agents, such as a browser. Examples of a browser may include, but are not limited to, Internet Explorer, available from Microsoft Corporation of Redmond, Wash., or Firefox, available from Mozilla of Mountain View, Calif.

Figure 2:
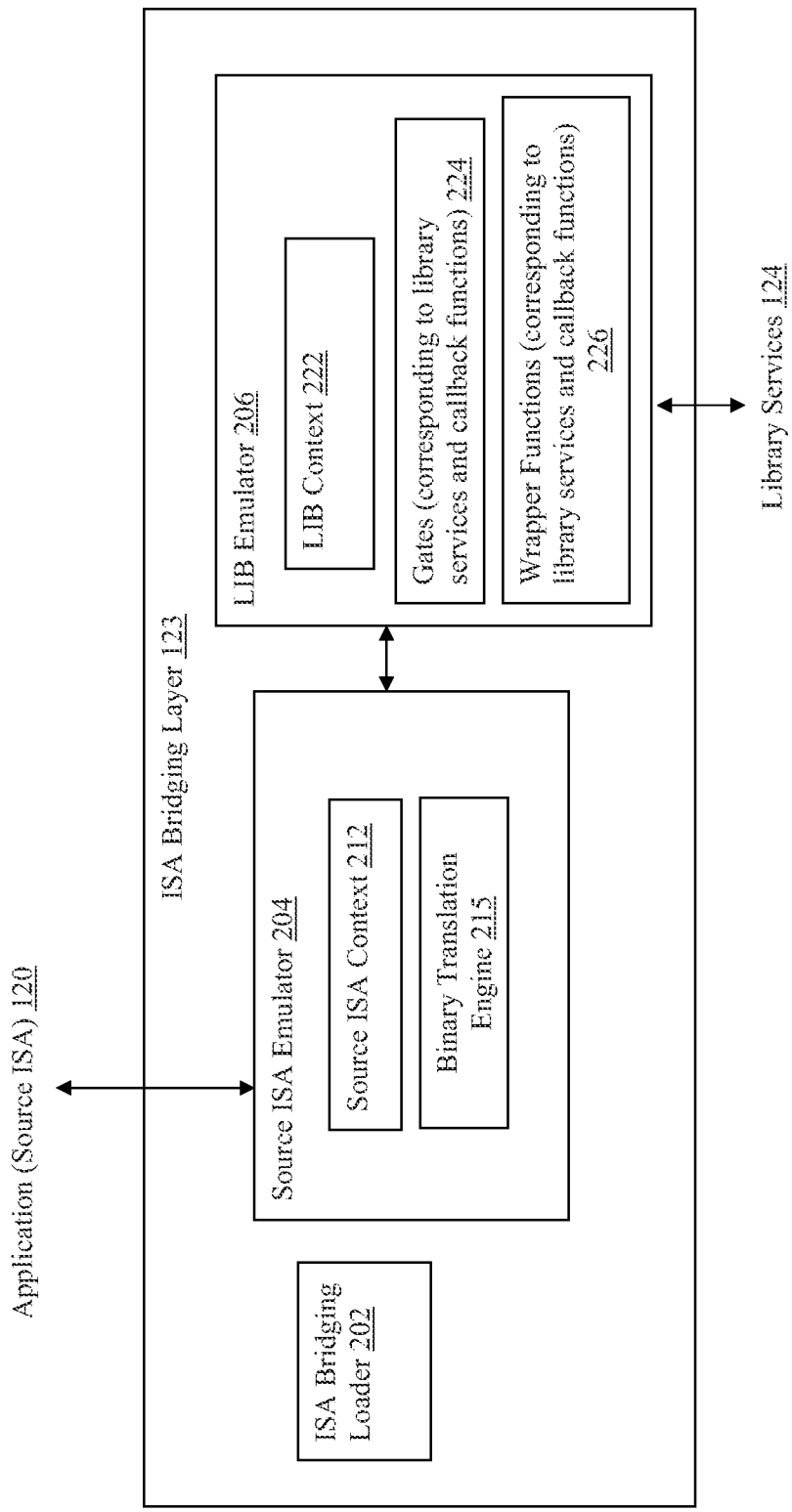
FIG. 2 illustrates ISA bridging layer of FIG. 1 in further detail.

Referring now to FIG. 2, wherein illustrated is an example ISA bridging layer 123, in accordance with various embodiments of the present disclosure. As shown, for the embodiments, ISA bridging layer 123 may include ISA bridging loader 202, source ISA emulator 204 and target ISA Library emulator 206 (hereinafter, simply LIB emulator), configured to provide various runtime features and services including, but not limited to, dynamic binding services. Source ISA emulator 204 may include source ISA context 212, and binary translation engine 215. Source ISA emulator 204 may maintain in source ISA context 212, the execution context of source ISA architecture including, but not limited to, e.g., the current execution instruction pointer (IP). Binary translator engine 215 may be configured to translate source ISA instructions to target ISA instructions. LIB emulator 206 may include target ISA Library (LIB) context 222, gates 224 and wrapper functions 226. LIB emulator 206 may maintain in target ISA Library (LIB) context 222, the execution context of target ISA Library. In various embodiments, there may also be one corresponding pair of gate 224 and wrapper function 226 per library service 124, configured to facilitate calling of library service 124 by application 120, across the source and target ISA architectures. Similarly, there may be one corresponding pair of gate 224 and wrapper function 226 per callback function 125, configured to facilitate callback of callback function 125 by library services 124, across the target and source ISA architectures.

ISA bridging loader 202 may be configured to load application 120. In loading application 120, ISA bridging loader 202 may be configured to resolve any unresolved symbolic names of application 120 associated with calling library services to appropriate ones of the library services 124. In embodiments, ISA bridging loader 202 may be configured to resolve any unresolved symbolic names of application 120 associated with calling library services to addresses of the corresponding gates 224 of library services 124. Additionally, ISA bridging loader 202 may be configured to modify the symbolic names or references to callback functions 125 to internal names, and associate the symbolic names or references to callback functions 125 to the corresponding wrapper functions 226.

ISA bridging loader 202 may gain control of the loading from the loader of OS 122 (or middleware 121, if employed) in any one of a number of known manners. Examples of such known manners may include the use of binary format based control transfer or load/pre-load variables when supported by OS 122 or middleware 121. In other embodiments, the loader of OS 122 (or middleware 121, if employed) may be modified to facilitate the transfer of control to ISA bridging loader 202 instead.

As described earlier, source ISA emulator 204 may be configured to maintain source ISA execution context 212. Source ISA emulator 204 may be configured to track the source ISA IP (instruction pointer) during execution of application 120. When application 120 attempts to invoke a library service 124, source ISA emulator 204 monitoring source ISA execution may invoke and transfer execution control to LIB emulator 206 instead. In various embodiments, source ISA emulator 204 may invoke and transfer execution control to the corresponding gate 224 of the library service 124.

LIB emulator 206 may likewise be configured to maintain target ISA library (LIB) execution context 222.

Gates 224 corresponding to library services 124 may be configured to respectively redirect calls to library services 124 to the corresponding wrapper functions 226 to process and set up the calls. Whereas gates 224 corresponding to callback functions 125 may be configured to respectively transfer execution control for callbacks from the corresponding wrapper functions 226 to source ISA emulator 204. In various embodiments, each gate 224 may include an instruction configured to effectuate the redirect to the corresponding wrapper function 226 or source ISA emulator 204. In various embodiments, the instruction of each gate 224 may be a source ISA instruction configured to cooperate with the binary translation engine 215 to effectuate execution control redirection. In various embodiments, each gate 224 may further include an indicator identifying the corresponding wrapper function 226.

In various embodiments, for processing and setting up a call to the corresponding library service 124, each wrapper function 226 corresponding to a library service 124 may be configured to retrieve the associated parameter values of the call from source ISA context 212, convert the call from the source ISA application binary interface (ABI) format to the target ISA ABI format, and save the converted call with the parameter values in LIB context 222.

On a callback to a callback function 125, execution control may be transferred to the corresponding wrapper function 226 of callback function 125. In various embodiments, for processing and setting up a callback to a callback function 125 of application 120, each wrapper function 226 corresponding to a callback function 125 may be configured to convert the callback from the target ISA ABI format to the source ISA ABI format, attach the associated parameter values of the callback, and save the converted callback with the parameter values in source ISA context 212.

Gates 224 corresponding to a callback function 125 may be configured to invoke the source ISA emulator 204 with the source ISA context prepared by wrapper function 226 corresponding to the callback function 125 to emulate the callback function presented in Source ISA format on target ISA.

Figure 3:
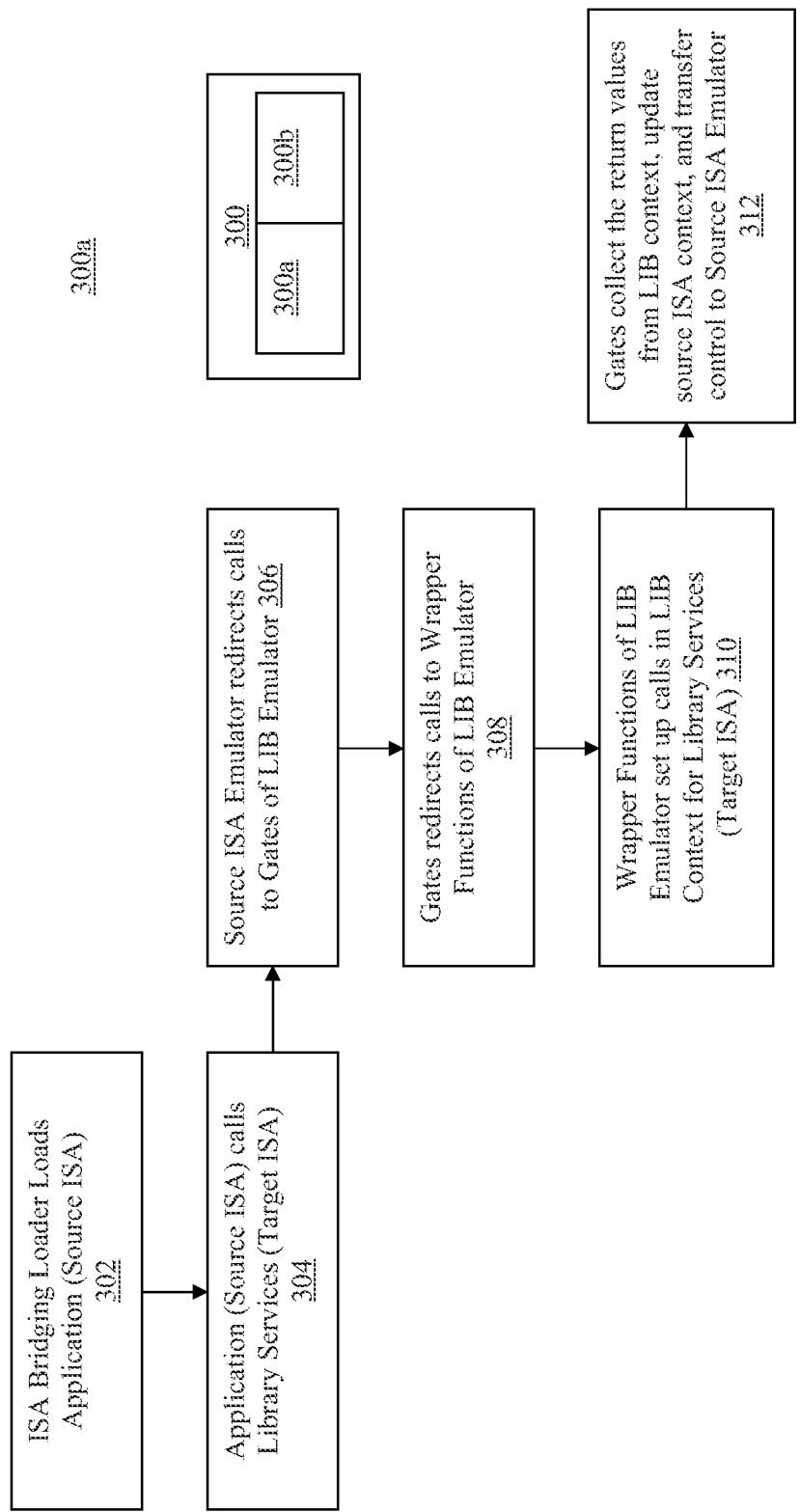
FIGS. 3 and 4 illustrate methods for bridging calls and callbacks between an application of a source ISA and library services of a target ISA.
Figure 4:
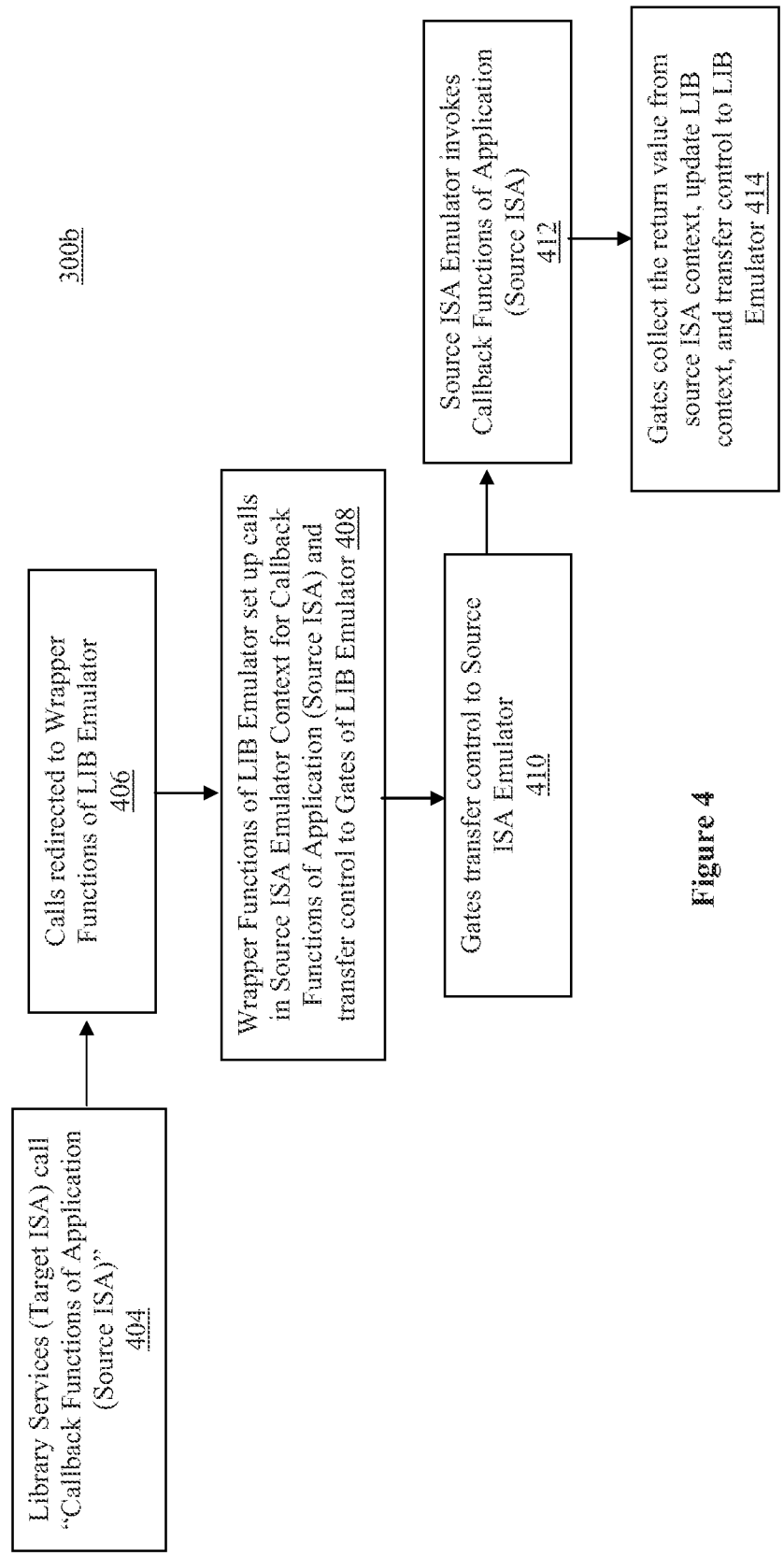

Referring now to FIGS. 3-4, wherein illustrated is an example ISA bridging method with callback, in accordance with various embodiments of the present disclosure. As shown, method 300 may include two parts, part 300*a* for bridging calls from application 120 (of source ISA) to library services 124 (of target ISA), and part 300*b* for bridging callbacks from a library service 124 (of target ISA) to a callback function of application 120 (of source ISA).

Part 300*a* may begin at block 302. At block 302, ISA bridging loader 202 may load application 120. In loading application 120, ISA bridging loader 202 may resolve the symbolic names or references of application 120 to library services 124, and modify symbolic names or references of callback functions 125, as earlier described. From block 302, part 300*a* may proceed to block 304. At block 304, in the course of execution, application 120 may call one of library services 124. In various embodiments, application 120 may require a callback to one of its callback functions 125 by the called library service 124. In embodiments, application 120 may include as part of the call to the called library service 124 a pointer to the callback function 125 to be callback. Instead of passing the pointer to the callback function 125, the wrapper function 226 of the library service 124 may pass the corresponding wrapper function 226 of the call back function 125.

From block 304, part 300*a* may proceed to block 306. At block 306, source ISA emulator 204, on detection of the call through e.g., monitoring of the source ISA IP and determining that the IP is referencing an address within the address scope of the target library, may redirect the call and transfer execution control to the corresponding gate 224 of the library service 124 in LIB emulator 206. From block 306, part 300*a* may proceed to block 308. At block 308, gate 224 may further redirect the call and transfer execution control to the corresponding wrapper function 226 of the called library service 124. From block 308, part 300*a* may proceed to block 310. At block 310, wrapper function 226 of the called library service 124 may process the call, and set up the call in LIB context 222 for execution by the called library service 124, as earlier described. From block 310, part 300*a* may proceed to block 312. At block 312, gate 224 of the called library service 124 may collect the return value(s) of the call from LIB context 222, update source ISA context 212, and transfer execution control to source ISA emulator 202 to return the return values of the library service call to application 125.

Referring now to FIG. 4, part 300*b* may begin at block 404. At block 404, in the course or on completion of a called library service 124, the library service 124 may callback a callback function 125 of application 120, e.g., by calling the callback pointer passed by application 120. From block 404, part 300*b* may proceed to block 406, as the callback pointer is the wrapper function 226 corresponding to the callback function 125. At block 406, execution control may be transferred to the corresponding wrapper function 226 of callback function 125, in accordance with the modified reference. From block 406, part 300*b* may proceed to block 408. At block 408, wrapper function 226 may process the callback, set up the callback in source ISA context 212 for execution by the callback function 125 of application 120, as described earlier, and thereafter, transfer execution control to the corresponding gate 224 of the callback function 125. From block 408, part 300*b* may proceed to block 410. At block 410, gate 224 corresponding to the callback function 125 may redirect the callback and transfer execution control to the ISA emulator with the source ISA context prepared by the wrapper function 226.

Further, at block 412, on detection of the call through, e.g., monitoring of the source ISA IP and determining that the IP is referencing an address within the address scope of the gates 224 corresponding to call back functions 125, source ISA emulator 204 may redirect the source ISA IP to the call back function to continue the emulation. From block 412, part 300*b* may proceed to block 414. At block 414, gate 224 of the callback function 125 may collect the return value(s) of the callback from source ISA context 212, update LIB context 222, and transfer execution control to LIB emulator 204 to return the return values of the callback function 125 to the library service 124.

Figure 5:
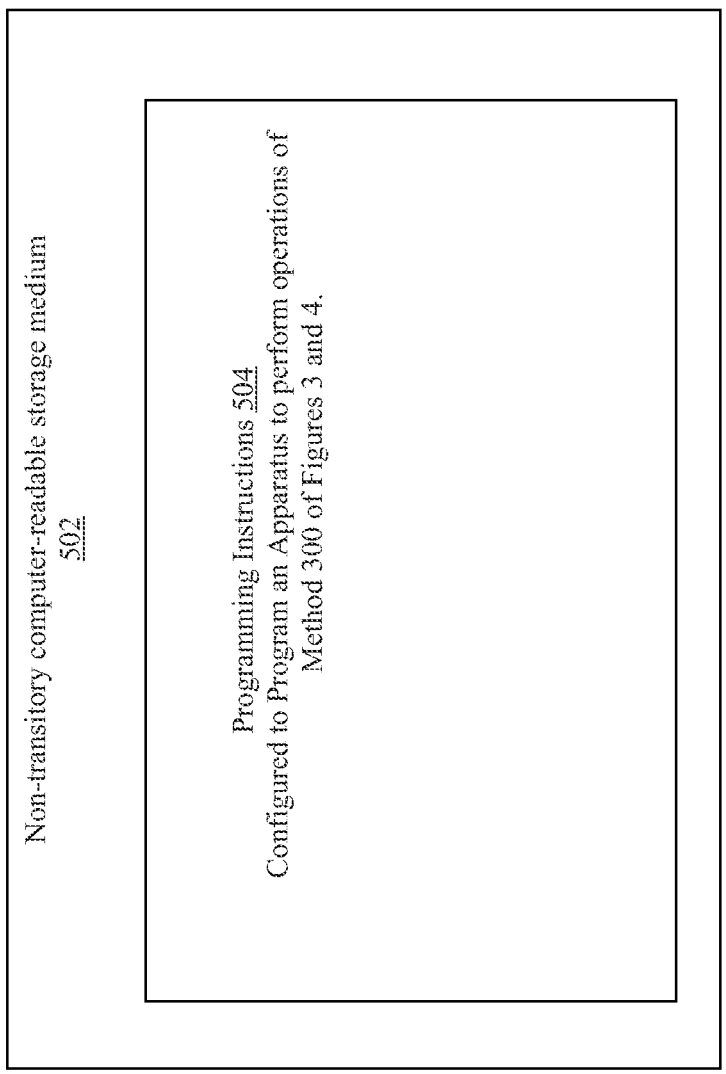
FIG. 5 illustrates an example non-transitory computer-readable storage medium having instructions configured to practice all or selected aspects of the method of FIGS. 3 and 4; all arranged in accordance with embodiments of the present disclosure.

FIG. 5 illustrates an example non-transitory computer-readable storage medium having instructions configured to practice all or selected aspects of the method of FIGS. 3 and 4 in accordance with various embodiments of the present disclosure. As illustrated, non-transitory computer-readable storage medium 502 may include a number of programming instructions 504. Programming instructions 504 may be configured to enable a computing device, e.g. computing device 102, in response to execution of the programming instructions, to perform all or selected aspects of the ISA bridging operations of method 300 earlier described with references to FIGS. 3 and 4. In alternate embodiments, programming instructions 504 may be disposed on multiple non-transitory computer-readable storage media 502.

Referring back to FIG. 1, for one embodiment, at least one of the processor(s) of processor and memory arrangement 104 may be packaged together with the computational logic (or a subset thereof) of ISA bridging layer 123 configured to practice the operations (or a subset thereof) of method 300 of FIGS. 3 and 4. For one embodiment, at least one of the processor(s) of processor and memory arrangement 104 may be packaged together with the computational logic (or a subset thereof) of ISA bridging layer 123 configured to practice the operations (or a subset thereof) of method 300 of FIGS. 3 and 4 to form a System in Package (SiP). For one embodiment, at least one of the processor(s) of processor and memory arrangement 104 may be integrated on the same die with the computational logic (or a subset thereof) of ISA bridging layer 123 configured to practice the operations (or a subset thereof) of method 300 of FIGS. 3 and 4. For one embodiment, at least one of the processor(s) of processor and memory arrangement 104 may be integrated on the same die with the computational logic (or a subset thereof) of ISA bridging layer 123 configured to practice the operations (or a subset thereof) of method 300 of FIGS. 3 and 4 to form a System on Chip (SoC). For at least one embodiment, the SoC may be utilized in a desktop computer, a laptop computer, a smartphone, a computing tablet, an Internet appliance, a personal digital assistant (PDA), a portable game playing device, a server or other computing devices.

Still referring to FIG. 1, while for ease of understanding, the present disclosure has been described with one ISA bridging layer 123 bridging one source ISA to one target ISA. However, the present disclosure is not so limited. In embodiments, multiple different ISA bridging layers 123 may be provided to bridge multiple different source ISA to the target ISA. In some of these embodiments, a dispatcher may additionally be provided to detect the bridging required, and instantiates the appropriate ISA bridging layer or layers 123 to provide the required ISA bridging.

Further, in various embodiments, the present disclosure may be practiced with substituted binaries (in target ISA) for portions of application 120 (in source ISA) to reduce the amount of bridging needed. In other embodiments, some of the resources used for bridging, e.g., some of the wrapper functions, may be located on a remote server accessible to ISA bridging layer 123.

Still further, while for ease of understanding, ISA bridging layer 123 has been described as being configured to bridge source ISA and target ISA that are different. However, the disclosure is not so limited. It is contemplated that for various applications, ISA bridging layer 123 may be employed to bridge source ISA and target ISA that are the same. In such applications, one or more of the described elements, e.g., binary translation engine 215, may not be needed. An example of such application may be to provide enhanced operational security to computing device 102. Other applications may likewise benefit from such bridging.

Thus, although specific embodiments have been illustrated and described herein, it will be appreciated by those of ordinary skill in the art that a wide variety of alternate and/or equivalent implementations may be substituted for the specific embodiments shown and described.

Accordingly, it will be appreciated that the present disclosure may be a solution to the technical problem of a computing device with one ISA supporting applications developed for another ISA where the applications have usage characteristics of requiring, on occasions, callbacks from the called library services. The advantage of the present disclosure may include, but is not limited to, avoiding the need to fully translate or re-implement the application in the computing device's ISA.

It will also be appreciated that the present disclosure may be a solution to the technical problem of providing enhanced security to a computing device. The advantage of the present disclosure may include, but is not limited to, the robustness of the isolation provided.

What is claimed is:

1. At least one non-transitory computer-readable storage medium comprising instructions to cause a target device with a target computer processor supporting a target instruction set architecture, in response to execution of the instructions, to provide an instruction set architecture bridging layer to the target device to facilitate a library service of a library of the target device, called by an application operating on the target device, to callback a callback function of the application; wherein the library service is implemented for the target instruction set architecture, and the application is implemented at least partially for a source instruction set architecture of a source computer processor; wherein the source and target instruction set architectures of the source and target computer processors are different computer processor instruction set architectures of different computer processor families; and wherein the instruction set architecture bridging layer includes a source instruction set architecture emulator and a library emulator that cooperates with each to enable the application to call the library service, and the library service to callback the callback function, across the source and target instruction set architectures;

wherein the source instruction set architecture emulator is to maintain an execution context of the source instruction set architecture, and the library emulator is to maintain a library execution context;

wherein the library emulator further includes a gate corresponding to the library service to redirect the call to a wrapper function corresponding to the library service; and the wrapper function corresponding to the library service is to process the call, and set up the call in the library execution context.

2. The at least one computer-readable storage medium of claim 1, wherein the gate is a first gate, and wherein the library emulator further includes a second gate corresponding to the callback function to redirect the callback to the source instruction set architecture emulator.

3. The at least one computer-readable storage medium of claim 1, wherein the wrapper function is a first wrapper function; and wherein the library emulator further includes a second wrapper function corresponding to the callback function to process the callback, set up the callback in the execution context of the source instruction set architecture, and redirect the callback to a gate of the library emulator corresponding to the callback function.

4. The at least one computer-readable storage medium of claim 1, wherein the instruction set architecture bridging layer further includes a loader; wherein the loader is to load the application, and modify a symbolic name that references the library service in a manner that enables the library emulator to intervene in enabling the call.

5. The at least one computer-readable storage medium of claim 4, wherein the loader is further to modify a symbolic name that references a callback function of the application, in a manner that enables the source instruction set architecture emulator to intervene in enabling the callback.

6. A method for bridging a source instruction set architecture of a source computer processor to a target instruction set architecture of a target computer processor with callback, wherein the source and target instruction set architectures of the source and target computer processors are different computer processor instruction set architectures of different computer processor families, the method comprising: maintaining a source instruction set architecture execution context, by a source instruction set architecture emulator of an instruction set architecture bridging layer of a computing device, wherein the computing device comprises a library service implemented in the target instruction set architecture, the computing device having the target computer processor; maintaining a library execution context, by a library emulator of the instruction set architecture bridging layer of the computing device; and cooperating between the source instruction set architecture emulator and the library emulator to facilitate an application, operating on the computing device and implemented at least partially in the source instruction set architecture, to call the library service, and the library service to callback a callback function of the application, across the source and target instruction set architectures; wherein cooperating comprises redirecting the call, by a gate of the library emulator corresponding to the library service, to a wrapper function corresponding to the library service; and processing, by the wrapper function corresponding to the library service, to process the call, and set up the call in the library execution context.

7. The method of claim 6, wherein the wrapper function is a first wrapper function, and the method further comprises redirecting the callback to a second wrapper function of the library emulator corresponding to the callback function, to process the callback, and set up the callback in the execution context of the source instruction set architecture.

8. The method of claim 6, wherein the gate is a first gate, and the method further comprises redirecting the callback to the source instruction set architecture emulator, by a second gate of the library emulator corresponding to the callback function.

9. The method of claim 6, further comprising loading the application, by a loader associated with the source instruction set architecture emulator and the library emulator, including modifying a symbolic name that references the library service in a manner that enables the library emulator to intervene in enabling the call.

10. The method of claim 9, further comprising modifying, by the loader, a symbolic name that references a callback function of the application, in a manner that enables the source instruction set architecture emulator to intervene in enabling the callback.

11. An apparatus for executing an application implemented at least partially in a source instruction set architecture of a source computer processor, the apparatus comprising: a target computer processor and memory arrangement having a target instruction set architecture, wherein the source and target instruction set architectures of the source and target computer processors are different processor instruction set architectures of different computer processor families; and an instruction set architecture bridging layer, including a source instruction set architecture emulator and a library emulator, to be operated by the target computer processor and memory to cooperate to enable the application implemented at least partially in the source instruction set architecture, to call a library service of the apparatus, implemented in the target instruction set architecture, and the library service to callback a callback function of the application, across the source and target instruction set architectures; wherein the source instruction set architecture emulator is to maintain an execution context of the source instruction set architecture, and the library emulator is to maintain a library execution context; wherein the library emulator further includes a gate corresponding to the library service to redirect the call to a wrapper function corresponding to the library service; and wherein the library emulator further includes a wrapper function corresponding to the library service; wherein the wrapper function is to process the call, and set up the call in the library execution context.

12. The apparatus of claim 11, wherein the gate is a first gate, and the library emulator further includes a second gate corresponding to the callback function to redirect the callback to the source instruction set architecture emulator.

13. The apparatus of claim 11, wherein the wrapper function is a first wrapper function, and the library emulator further includes a second wrapper function corresponding to the callback function to process the callback, set up the callback in the execution context of the source instruction set architecture, and redirect the callback to a gate of the library emulator corresponding to the callback function.

14. The apparatus of claim 11, wherein the instruction set architecture bridging layer further includes a loader; wherein the loader is to load the application, and modify a symbolic name that references the library service in a manner that enables the library emulator to intervene in enabling the call.

15. The apparatus of claim 14, wherein the loader is further to modify a symbolic name that references a callback function of the application, in a manner that enables the source instruction set architecture emulator to intervene in enabling the callback.

16. The apparatus of claim 11, further comprising an operating system comprising the library services.

17. The apparatus of claim 11, further comprising an instruction set architecture independent application execution environment; wherein the application further uses at least one other service of the instruction set architecture independent application execution environment.

* * * * *